(No Model.)  2 Sheets—Sheet 1.

A. H. OVERMAN.
SADDLE FOR VELOCIPEDES.

No. 331,001. Patented Nov. 24, 1885.

WITNESSES:
Edward H Rogers
C. L. Small Jr.

INVENTOR
Albert H. Overman
By Geo. D. Seymour
ATTORNEY (No Model.)

A. H. OVERMAN.
SADDLE FOR VELOCIPEDES.

No. 331,001. Patented Nov. 24, 1885.

WITNESSES:

INVENTOR

UNITED STATES PATENT OFFICE.

ALBERT H. OVERMAN, OF CHICOPEE, MASSACHUSETTS.

SADDLE FOR VELOCIPEDES.

SPECIFICATION forming part of Letters Patent No. 331,001, dated November 24, 1885.

Application filed December 23, 1884. Serial No. 151,049. (No model.)

*To all whom it may concern:*

Be it known that I, ALBERT H. OVERMAN, residing at Chicopee, in the county of Hampden and State of Massachusetts, have invented certain new and useful Improvements in Saddles for Velocipedes; and I do declare the following to be a full, clear, and exact description of the same, reference being had to the accompanying drawings, which form a part of this specification.

My invention relates to an improvement in saddles for velocipedes, the object being to produce a suspension-saddle adapted to be attached to and detached from its supports at pleasure, and to protect the garments of the rider, and combining comfort, simplicity, and durability.

With these ends in view my invention consists in a suspension-saddle connected with its supports so as to be attached to and detached from them at pleasure.

My invention further consists in a suspension saddle extended on each side of its forward end to form depending protective skirts or flaps.

My invention further consists in a bicycle having a suspension-saddle, a spring adapted to be thrown forward, and having the rear end of the saddle detachably connected with it, and detachable connection between the forward end of the saddle and the steering-head of the vehicle.

My invention further consists in certain details of construction and combinations of parts, as will be hereinafter described, and pointed out in the claims.

Figure 1:
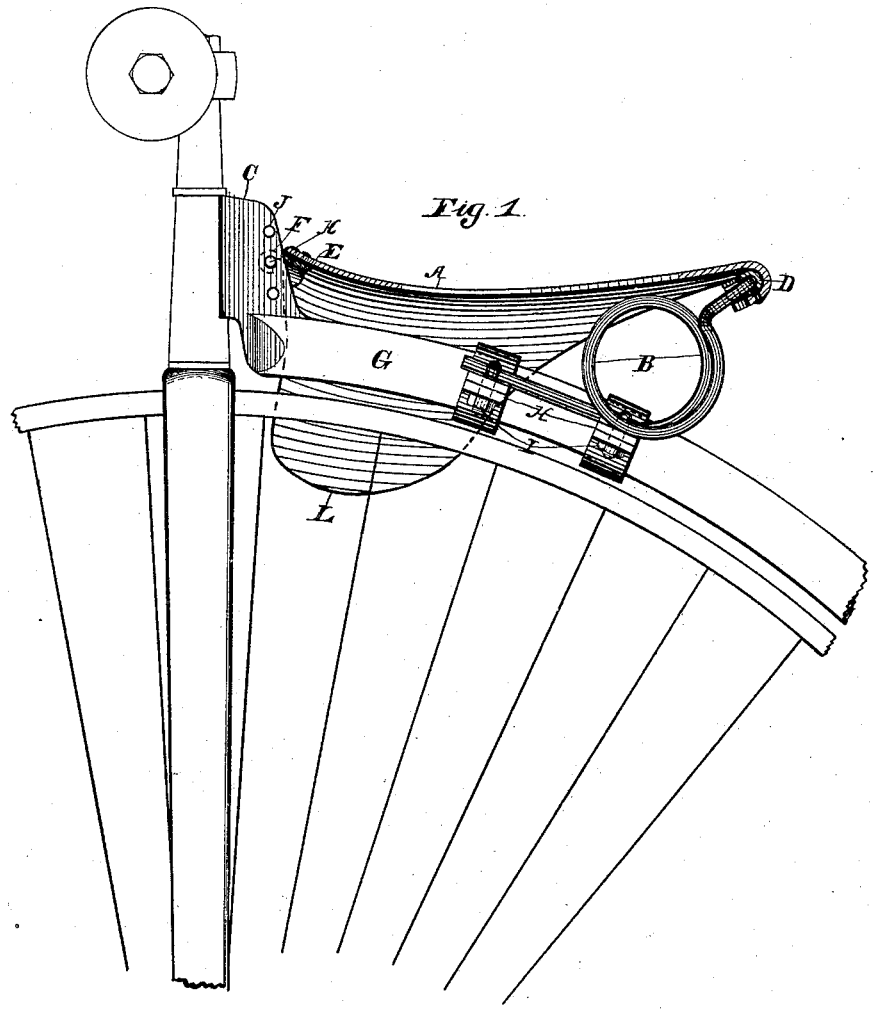
Figure 2:
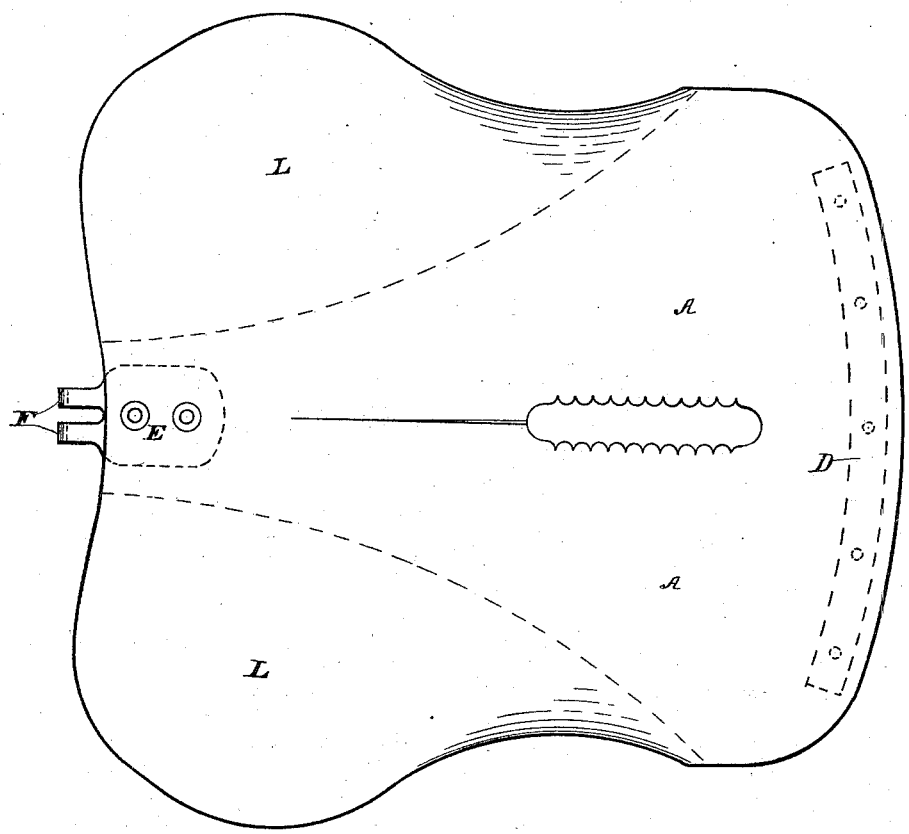

In the accompanying drawings, Figure 1 is a view showing a portion of a bicycle provided with a saddle embodying my invention and represented in section, and Fig. 2 is a detached plan view of the saddle with its skirts or flaps extended.

The saddle A, as shown, is made in one piece or undivided, and has its rear and forward ends respectively engaged with the spring B and the steering-head C of the bicycle, so as to be detachable at pleasure. For this purpose a U-shaped stay is secured within the rear end of the saddle, F, to which it is conformed in shape, while a plate terminating in a bifurcated hook, F, is secured within the forward end of the saddle. The spring aforesaid is formed from a single piece of heavy prepared steel wire shaped to the outline of the rear end of the saddle, coiled to give it additional elasticity, and having parallel ends, through which it is secured to the backbone G of the bicycle by means of straps H, held together by eyebolts I, through which the ends of the spring pass.

The steering-head C of the bicycle is provided with a series of holes, J, to receive a pin, K, with which the hook F of the plate E, attached to the forward end of the saddle, is engaged. The removal of the saddle is effected by throwing the spring forward with one hand until the said hook can be disengaged from the pin with the other hand, after which the saddle is drawn back to disengage it from the spring. To replace the saddle, it is engaged with the spring, which is then thrown forward with one hand until the hook can be engaged with the pin by the other hand. When detached, the saddle may be rolled into small compass and put into the pocket or otherwise disposed of.

By virtue of the described adaptation of the saddle to be detached at pleasure it may be protected from rain and weather and the bicycle dismantled against riding with the least inconvenience. The sides of the saddle are extended at its forward end to form skirts or flaps L, to protect the garments of the rider, and this is especially useful in the adaptation of my improved saddle to bicycles in which protection from the rim and tire of the wheel is necessary. The forward end of the saddle may be raised and lowered as desired by shifting the pin within the range of the series of holes formed in the steering-head, while the tension of the saddle and the pliancy of the spring are regulated and controlled by adjusting the spring and straps, either or both, as may be required.

It is apparent that the construction shown and described is susceptible of some modification. Thus, the stay located in the rear part of the saddle may be replaced by hooks or other equivalent means of adapting the saddle to be detachably engaged with the spring. The hook in the forward part of the saddle and the pin in the steering-head may be modified or replaced by any equivalent devices. If desired, also, provision may be made for controlling the tension of the saddle and for raising and lowering its forward end through an adjustable strap attached to its forward end and engaged with the steering-head. I would therefore have it understood that I do not limit myself to the exact construction shown and described, but hold myself at liberty to make such changes and alterations as fairly fall within the spirit and scope of my invention.

I am aware that a non-suspension saddle having protective skirts or flaps attached to it is old, and therefore I do not broadly claim a saddle having protective skirts or flaps.

Having fully described my invention, what I claim as new, and desire to secure by Letters Patent, is—

1. A flexible suspension-saddle, a spring forming the rear support of the saddle, which is detachably hooked to it, and detachable connection between the saddle and its forward support, whereby the saddle may be removed and attached at pleasure, substantially as set forth.

2. A flexible suspension-saddle, a U-shaped stay secured to its rear end, a spring forming the rear support of the saddle and adapted to have the said stay detachably connected with it, and detachable connection between the forward end of the saddle and its support, whereby the saddle may be attached to and detached from its supports at pleasure, substantially as set forth.

3. A flexible suspension-saddle, detachable connection between the same and its rear support, and a bifurcated hook attached to its forward end for detachable connection with its forward support, whereby the saddle may be attached to and detached from its supports at pleasure, substantially as set forth.

4. A flexible suspension-saddle, a spring located under the same and adapted to be thrown forward, and having the rear end of the saddle detachably connected with it, and detachable connection between the forward end of the saddle and its support, whereby the saddle may be attached to and detached from its supports at pleasure, substantially as set forth.

5. A saddle formed of flexible material and suspended at the rear and forward ends, and extended on each side at its forward end to form protective skirts or flaps for protection against the wheel of the vehicle, substantially as set forth.

6. In a bicycle, a suspension-saddle extended on each side, substantially as shown, to form protective skirts or flaps, a spring adapted to be thrown forward, and having the rear end of the saddle detachably connected with it, a bifurcated hook secured to the forward end of the saddle, and an adjustable pin located in the steering-head of the vehicle, and having the said hook detachably engaged with it, substantially as set forth.

In testimony whereof I have signed this specification in the presence of two subscribing witnesses.

ALBERT H. OVERMAN.

Witnesses:
W. W. McCLENCH,
A. C. BENTON.